July 8, 1941.　　　　R. L. LEVY　　　　2,248,684
WHEEL FOR AIRPLANE UNDERCARRIAGES OR OTHER HEAVY VEHICLES
Filed March 25, 1939　　　2 Sheets-Sheet 1

Inventor,
R. L. Levy
By: Glascock Downing Seebold
Attys.

July 8, 1941.    R. L. LEVY    2,248,684
WHEEL FOR AIRPLANE UNDERCARRIAGES OR OTHER HEAVY VEHICLES
Filed March 25, 1939    2 Sheets-Sheet 2

Inventor
R. L. Levy

Patented July 8, 1941

2,248,684

UNITED STATES PATENT OFFICE 2,248,684

WHEEL FOR AIRPLANE UNDERCARRIAGES OR OTHER HEAVY VEHICLES

René Lucien Levy, Montrouge, France, assignor to Societe d'Inventions Aeronautiques et Mecaniques S. I. A. M., Fribourg, Switzerland Application March 25, 1939, Serial No. 264,211
In France March 29, 1938

2 Claims. (Cl. 188—264)

In French Patent No. 779,937 of October 19, 1934, a wheel was described which is particularly intended for airplane undercarriages or other heavy vehicles, and is characterized by a ventilation principle by means of centrifugal effect.

The present invention has for its object to extend, to wheels having two brakes, the application of this principle which was described in the aforesaid patent as applied to wheels having a single brake, the duplication of the brakes being, of course, known per se.

A particular object of the present invention consists in the construction of a wheel having two brakes, which is remarkable by its self-cooling properties and is capable of operating satisfactorily under very heavy working conditions, said wheel being characterized by the fact that it comprises two juxtaposed half-wheels, in each of which a fixed part forming a brake plate is inwardly extended by two walls that form an annular space between them which enables the outer air that penetrates through two nozzles to be introduced inside the whole arrangement.

A feature of this wheel consists in the fact that the two brakes it is provided with, which are respectively added to each of the half-wheels, are free from the difficulties of dismounting that are often met with in wheels having two brakes. According to the invention, the fixed part of each half-wheel carries a brake which, together with said fixed part, is secured to the undercarriage strut or like carrier element, so that the braking reaction is directly transmitted by said fixed part to a carrier fork, or equivalent device, in which the wheel rotates.

Another object of the present invention consists in effecting the cooling of the wheels using the aforesaid principle of centrifugal ventilation, no longer by means of the outer air allowed to penetrate through the nozzle or nozzles into the wheel, but by means of a fluid under pressure, emanating from a source belonging to the vehicle, in particular to the airplane, said fluid under pressure being directed towards and into the wheel through a pipe connected to said source and replacing said nozzles.

A manner of carrying out this method of cooling consists, still according to the present invention, in atomizing, in the midst of said fluid under pressure, and before it is introduced into the wheel, a liquid which is intended, on the one hand to increase the specific heat of said fluid, and on the other hand to increase its specific mass, and consequently to intensify the centrifugal effects—therefore the speed of circulation— and at the same time the heat absorbing power of the fluid which effects the cooling.

An embodiment of a wheel which possesses some of the above mentioned features is shown in the accompanying drawings in which.

Figure 1:
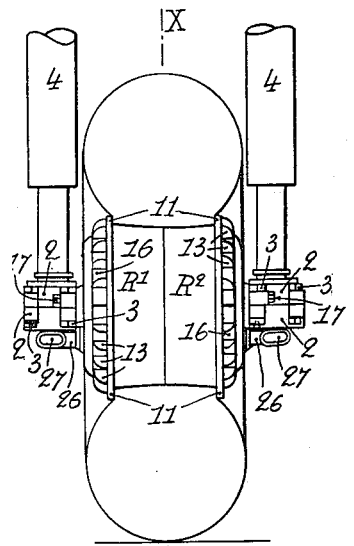
Fig. 1 is a front view of the assembled wheel mounted in a fork.
Figure 3:
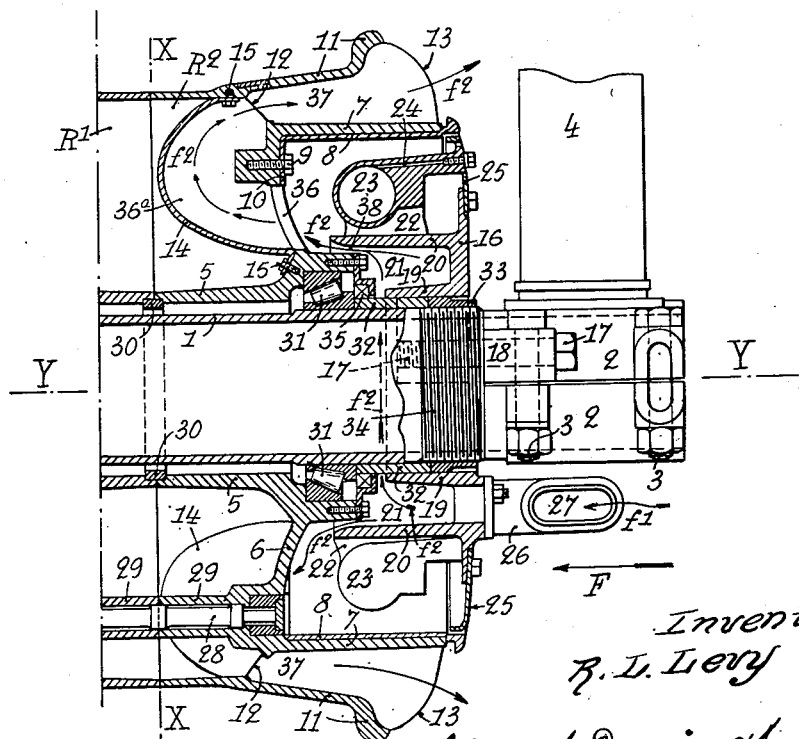
Fig. 3 is a vertical diametrical section of one of the half-wheels.
Figure 4:
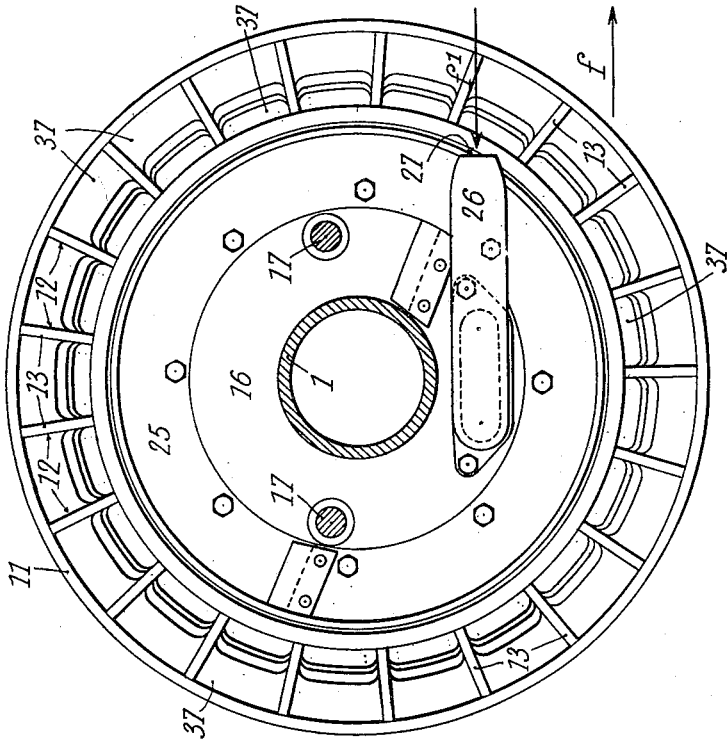
Fig. 4 is a corresponding view to Fig. 2, but on a larger scale and the fork being assumed to be removed.

The wheel is formed by two identical half-wheels $R^1$—$R^2$ which are juxtaposed and assembled along the plane X—X which forms the medial plane of the wheel (Figs. 1 and 3).

The wheel rotates on a fixed axle 1, each of the ends of which is clamped between two bearing-bushes 2—2 by means of bolts and nuts 3—3, the axle being thus secured to the arms 4—4 of a fork which may form part of an oleo-pneumatic shock-absorbing device.

Each of the two half-wheels includes, after mounting on the axle, a movable part and a fixed part.

Figure 5:
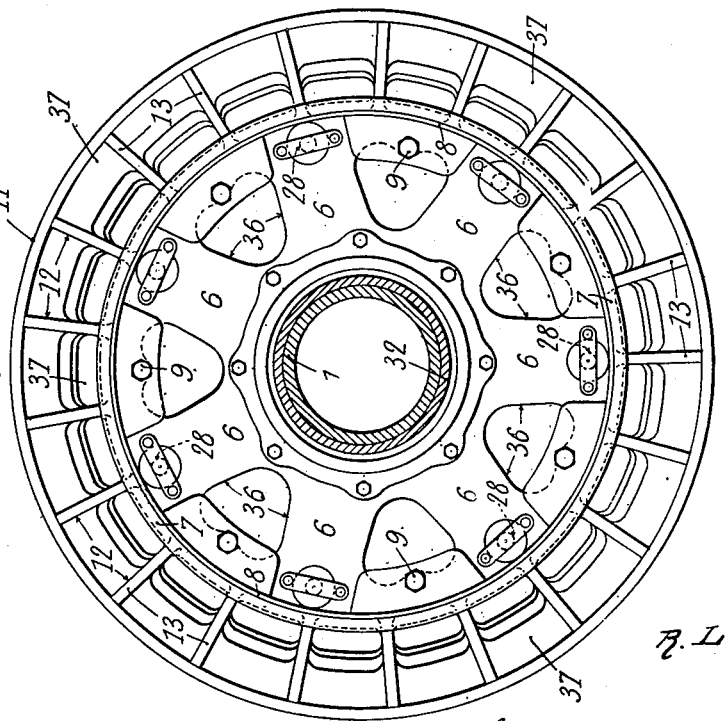
Fig. 5 is also a side view of a half-wheel, seen in the direction of the arrow F of Fig. 3, the fixed part of said half-wheel being assumed to be removed and certain elements being shown in section.

The movable part is formed by a moulded body of revolution about the axis Y—Y. Said moulded body is provided with an inner ring 5 from which project radial arms 6. Said arms, which are seven in number in the embodiment shown (Fig. 5), are turned over at right angles at their periphery and are connected together to form a ring 7 which forms the brake drum.

On the inner wall of said drum is fixed a lining 8 which is secured by means of screws 9 passing through a collar 10 of the lining.

The movable part of each half-wheel finally includes a half-rim 11 connected to the drum 7 by radial ribs or fins 12, the front edges 13 of which project out of the wheel body as shown in Figs. 1 and 3. Finally, behind the brake drum, on the side towards the plane of juxtaposition X—X of the two half-wheels, the rear space of the movable part of each of same may be optionally closed by a series of sheet metal ends 14 which are connected to the ring 5 and to the rim 11 and are fixed on same by screws 15.

The fixed part of each half-wheel includes a brake plate 16 which, when it is being assembled, is secured to the fixed axle by means of bolts 17—17 passing through ears 18—18 cast on the bearing-bushes 2—2 (Figs. 1 to 4).

Said brake plate is extended inwardly by two walls of revolution 19—20 which form between them an annular space 21. From the wall 20, which is the furthest from the axis Y—Y, project ribs 22 carrying the braking members. In the example illustrated in the drawings, said ribs support the brake cylinders 23 that a channel 24 connects with the braking pipe (not shown). A metal plate 25, fixed to the peripheral edge of the brake plate, forms a shield which shelters the brake cylinders, and also the piston rods and the brake jaws (not shown), from dust and other outside deteriorating agents.

Figure 2:
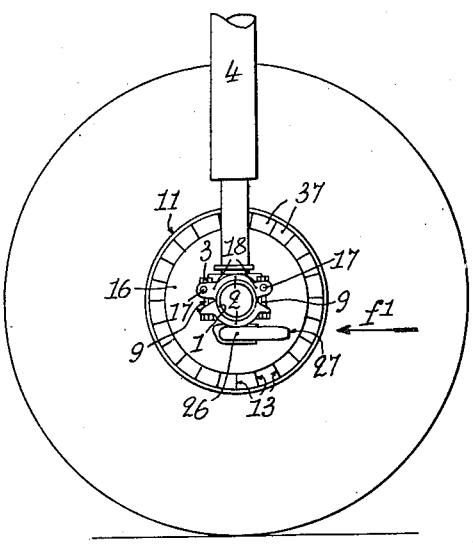
Fig. 2 is a corresponding side view.

Each brake plate carries on its outer face a nozzle 26, the opening 27 of which is directed forwards for the direction of travel $f$ of the wheel (Fig. 2).

For mounting, the two movable parts of the half-wheels are first of all juxtaposed along the plane X—X and assembled by means of bolts 28 distributed over the periphery and passing through the tubular projections 29 cast on the arms 6.

On the side towards the axle, the assembling of the two movable parts is facilitated by fitting a ring 30 on the contiguous edges of the rings 5.

After securing the movable parts, the bearing members are fitted on the axle 1, before the fixed parts are placed in position. In the example of the drawings, said members are formed by roller bearings 31 which, after having been passed over the axle 1, are pushed into their housings by the action of a sleeve 32, on the edge of which acts a threaded bush 33. Said bush is screwed on a threaded part 34 of the axle. A joint 35 retains the grease in the bearing.

After placing the roller bearing and its joint in position, the brake plates 16 are presented, at each end of the axle and are passed on to same, in such a manner that the inner ring 19 fits over the sleeve 32, then, the bearing-bushes being placed on the axle and pressed on same, the plates are in turn secured by the bolts 17—17 which, during braking, directly transmit the braking reaction to the shock-absorbing strut.

In the wheel thus formed, a self-cooling effect is observed during the rolling, due to the fact that the air which penetrates in the direction of the arrow $f^1$ into the nozzle 26 passes first of all through the chamber 21 of the fixed part of the brake, then through the spaces 36 between the arms 6, then through the cellular chambers 36$^a$, and finally through the cells 37, between the ribs 12, whence it escapes into the atmosphere, having followed the path shown by the arrows $f^2$.

I claim:

1. In a wheel assembly for an airplane, a fixed axle, a ring member rotatable on said axle, radial arms carried by said ring member, an annular member supported by said arms, radial ribs carried by said annular member, a rim connected to said radial ribs, an arched sheet member connected to said rim and to said ring member, a plate member secured to said axle, inwardly projecting cylindrical extensions on the inner face of the plate member forming an annular space therebetween open inside said annular member, and means for introducing a cooling medium into said annular space whereby the cooling medium engages said annular member and passes between said radial arms and outside the rim through spaces between said radial ribs.

2. In a wheel assembly for the undercarriage of an airplane, a fixed axle, a bearing mounted on said axle, a ring member surrounding said axle and rotatable on the bearing, radial arms carried by said ring member, an annular member supported by said arms, radial ribs carried by said annular member, a rim connected to said radial ribs, an inwardly arched sheet member connected to said ring member and sealed with respect to said rim, a wheel supporting element, a plate member secured to said axle and fixed with respect to said wheel supporting element, two inwardly projecting cylindrical extensions on the inner face of said plate member forming an annular space therebetween, a nozzle carried by the plate member having an inlet opening directed in the normal direction of travel of the airplane for introducing a fluid medium into said annular space whereby the medium engages the annular member and passes between said radial arms and outside the rim through spaces between said radial ribs.

RENÉ LUCIEN LEVY.